United States Patent Office 3,294,565
Patented Dec. 27, 1966

3,294,565
COATING COMPOSITIONS COMPRISING UNSATURATED HYDROCARBON POLYMERS AND A DRYING OIL
Joseph G. Svrchek, Hinsdale, Ill., assignor, by mesne assignments to W. R. Grace & Co., New York, N.Y., a corporation of Connecticut
No Drawing. Filed Dec. 20, 1963, Ser. No. 332,264
7 Claims. (Cl. 106—265)

The present invention relates to protective coatings, and, more specifically, to heat settable coatings including siccative constituents. The composition of the present invention is applicable to a wide variety of fields, including the coating of steel for subsequent fabrication, coating of tin plate for cans, pipe lines, and the life, where impact adhesion and flexibility are required.

The coating compositions of the present invention are based upon butadiene-styrene copolymers of the drying type, normally containing about 75 to 85% butadiene and 15 to 25% styrene. The butadiene and styrene are usually copolymerized in the presence of sodium and a reaction diluent such as an aliphatic hydrocarbon at temperatures ranging from about 25° C. to 95° C. While coating compositions based upon such copolymers have been heretofore proposed, such compositions are necessarily expensive and in many cases are not as flexible or as impact resistant as would be desirable for various applications.

It is acordingly an object of the present invention to provide improved coating compositions of the heat settable type with additives which not only decrease the cost of the composition but improve the adhesion on impact, and the flexibility of the resulting coatings.

Still another object of the invetnion is to provide an improved heat settable coating composition based upon butadiene-styrene type drying oil having a high solids content, thereby substantially reducing the amount of solvent which has to be eliminated from the coating.

Still a further object of the invention is to provide a butadiene-styrene coating composition in which less expensive copolymers of butadiene and styrene can be employed without sacrificing physical properties of the coating.

The coating composition of the present invention contains as its siccative components, a butadiene-styrene type drying oil, an olefinic liquid hydrocarbon containing dimers and trimers of olefins in the $C_5$ to $C_8$ range, and a drying oil. It has been found that the inclusion of these additives makes it possible to improve the impact adhesion and flexibility of butadiene-styrene type drying oils substantially, even the less expensive materials which heretofore have not been used substantially for coating purposes because of the inherent lack of flexibility in the resulting films.

Experimental results have shown that there is in the nature of a synergistic effect when both the olefinic hydrocarbon and the drying oil are used together. Even though there is a noticeable improvement in some characteristics of the butadiene-styrene copolymer when each constituent is used alone, the use of the two jointly provides improvements which are greater than the sum of the improvements obtainable with the materials when used alone. This is particularly evident in the matter of impact adhesion. The use of the olefinic hydracarbon alone in the butadiene-styrene copolymer is detrimental to impact adhesion, while the addition of a mixture of the olefinic hydrocarbon with tung oil, for example, actually improves the impact adhesion more than the addition of tung oil alone.

The olefinic liquid hydrocarbon constituent of the compositions of the present invention is readily obtainable from petroleum refining residues, and such hydrocarbon fractions are available on the market. One such commercially available material is "CTLA" polymer which is a heat reactive, olefinic liquid hydrocarbon obtained by partial polymerization of olefins over hot clay. The specifications for this material are given in the following table:

TABLE I

| Test | | Test Method |
|---|---|---|
| Gravity, API | 6–14 | ASTM D 287–55. |
| Viscosity, SSU at 210° F | 100–250 | ASTM D 88–53. |
| Nonvolatile Matter, Wt. percent, Min | 80 | ASTM D 154–53. |
| Iodine Number, cg./g., Min | 240 | ASTM D 555–54. |
| Water, Vol. percent, max | 0.8 | ASTM D 95–46. |
| Flash, COC, ° F., Min | 210 | ASTM D 92–52. |

Some typical properties of the material are given in the following table:

TABLE II

| | |
|---|---|
| Gravity, API | 9.2 |
| Viscosity, SSU at 210° F. | 205 |
| Flash, COC, ° F. | 310 |
| Iodine number, cg./g. | 255 |
| Ash, wt. percent | 0.06 |
| Nonvolatile matter, wt. percent | 95 |
| Color, Gardner (1 g. in 67 ml. water white xylene) | 10 |
| Acid number, mg. KOH/g. | 0.1 |
| Saponification number, mg. KOH/g. | 3.18 |
| Surface tension, dynes/cm. | 44.5 |
| Distillation at 10 mm. (ASTM D 1160), ° F.: | |
| IBP | 182 |
| 5% | 298 |
| 10% | 326 |
| 20% | 377 |
| 30% | 425 |
| 40% | 464 |
| 50% (cracked) | 504 |

The drying oil which can be used in accordance with the present invention can be any natural or synthetic drying oil having the required drying properties. The preferred drying oil is tung oil although other natural oils and derivatives of natural oils such as oiticica oil, linseed oil, soybean oil, dehydrated castor oil, or fish oil may be used, either raw or bodied.

There are a number of polybutadiene and butadiene-styrene copolymer drying oils available on the market from various manufacturers. The material known as "Buton 100" is an unoxidized copolymer containing 75 to 85% butadiene and 15 to 25% styrene. The material is substantially non-acid and is a viscous liquid which is highly unsaturated, having an iodine number of about 300. Its molecular weight ranges up to about 4,000, and is typically from 1,000 to 4,000. This material is the least expensive type of butadiene-styrene copolymer but has heretofore been considered inferior in coating properties to the partly oxidized butadiene-styrene copolymers, particularly in the matter of impact adhesion properties. By incorporating the olefinic hydrocarbon and the drying oil, however, it is possible to use this economical material with completely satisfactory results.

The partly oxidized copolymers referred to previously are prepared by air blowing the unoxidized material until the copolymer absorbs from about 5 to 20% of its weight in oxygen. This partial oxidation results in the production of polar groups in the molecule, including hydroxyl groups and carboxyl groups. The partly oxidized material is sufficiently acid to have an acid number on the order of 5 to 18. The copolymer is dissolved in an aromatic hydrocarbon solvent during oxidation. Some of the solvent is then stripped off, leaving a solids content of about 58 to 60%. Enough isopropanol is then added to produce a composition having about 50% solids. This type of material is marketed under the trademark "Buton 200."

The unoxidized copolymer normally has a substantially slower reaction, i.e., setting rate than does the partly oxidized copolymer. However, I have found that by including the additives of the present invention in the composition, the setting rate of the unoxidized copolymer can be improved to the point where it reacts at substantially the same rate as the more expensive, partly oxidized copolymer.

The additives can be added to the butadiene-styrene copolymer (oxidized or unoxidized, or mixtures of the two) in varying proportions. I prefer, however, to add enough of the combination of the olefinic hydrocarbon and the drying oil so that the mixture constitutes from about 5 to 50% by weight of the copolymer present. The relative ratios between the olefinic hydrocarbon and the drying oil can be varied, but best results are obtained when the ratio of olefinic hydrocarbon to drying oil is on the order of 1 to 2 to 2 to 1.

The compositions of the present invention may also include other ingredients such as pigments, extenders, and the like as well as enough solvent, where required, to produce a sprayable consistency. It is advisable, however, that the solids content be kept as high as possible to avoid the possibility of blistering. In the improved compositions of the present invention, the solids content may be 80% by weight or higher.

The compositions of the present invention may be applied in a variety of processes. One of these involves spraying the heat reactive material in combination with a flammable liquid diluent at a temperature above the flash point of the diluent to atomize the coating composition, and directing the resulting spray through an envelope of flame and heat directed at the surface to be coated. While in the zone of flame and heat, the polymerization of the copolymer continues at a rapid rate so that shortly after application to the surface in the form of a continuous film, the copolymer is set to an infusible coating which is resistant to attack by chemicals, bacteria, and electrolytic corrosion.

The materials may also be applied by spraying them onto a preheated article without the use of a flame and heat envelope, provided that the freshly applied coating is shortly thereafter contacted with a curing flame or other heat source sufficient to advance substantially the curing of the copolymer into its finally set form.

The following table illustrates the results obtained with various compositions produced according to the present invention, and compared with control samples. In each case, the material was applied as a uniform film and then baked on to the surface at 480° F. for 4 minutes.

| Material | Pencil Hardness | Flexibility (bending over ⅛" mandrel) | Impact in in.-lbs. |
| --- | --- | --- | --- |
| "Buton 100" | <B | Failed | 30–40 |
| "Buton 100" plus 10% "CTLA." | B | ___do___ | 24–30 |
| "Buton 100" plus 10% tung oil | B | Slight cracks | 44–60 |
| "Buton 100" plus 25% "CTLA." | F | Pass | 20–24 |
| "Buton 100" plus 25% tung oil | HB | ___do___ | 80–120 |
| "Buton 100" plus 12.5% "CTLA" plus 12.5% tung oil | HB | ___do___ | 120–160 |
| "Buton 100" plus 25% "CTLA" plus 25% tung oil | F | ___do___ | Over 160 |
| "Buton 100" plus 50% tung oil | HB | Fine cracks | 10–16 |
| "Buton 200" | F | Pass | 40 |
| "Buton 200" plus 25% "CTLA" plus 25% tung oil | HF | ___do___ | Over 160 |

From the foregoing table, it will be seen that the combination of the olefinic hydrocarbon and the drying oil improves the overall performance of coatings containing the butadiene-styrene copolymers to an extent not achieved with the use of the additives individually. While the examples are based upon the use of a particular olefinic hydrocarbon liquid, and a particular drying oil, it should be recognized that these examples are submitted for purposes of illustration only and not as limitations on the scope of the invention.

It should also be evident that other modifications can be made to the described embodiments without departing from the scope of the present invention.

I claim as my invention:
1. A heat settable coating composition in which the siccative constituents consist essentially of a mixture of a heat settable copolymer of from 75 to 85% butadiene and 25–15% by weight styrene, the copolymer being a member of the group consisting of butadiene-styrene copolymers, oxidized butadiene-styrene copolymers containing from 5–20% by weight oxygen, and mixtures thereof, an olefinic liquid hydrocarbon containing dimers and trimers of olefins in the $C_5$ to $C_8$ range, and a drying oil, the weight ratio of said olefinic liquid hydrocarbon to said drying oil being from 1 to 2 to 2 to 1, and the sum of olefin liquid hydrocarbon plus drying oil content constituting from 5 to 50% by weight of the copolymer present.
2. The composition of claim 1 in which said drying oil is tung oil.
3. The composition of claim 1 in which said drying oil is oiticica oil.
4. The composition of claim 1 in which said drying oil is linseed oil.
5. The composition of claim 1 in which said drying oil is soybean oil.
6. The composition of claim 1 in which said drying oil is dehydrated castor oil.
7. The composition of claim 1 in which said drying oil is a fish oil.

References Cited by the Examiner

UNITED STATES PATENTS

| | | | |
| --- | --- | --- | --- |
| 2,779,750 | 1/1957 | Fuqua et al. | 260—23.7 |
| 2,846,329 | 8/1958 | Koenecke | 260—23.7 |
| 2,861,966 | 11/1958 | Betts et al. | 260—23.7 |
| 3,048,562 | 8/1962 | Cull et al. | 260—23.7 |

DONALD E. CZAJA, *Primary Examiner.*

LEON J. BERCOVITZ, *Examiner.*

R. WHITE, *Assistant Examiner.*